United States Patent
Nakazawa

(10) Patent No.: US 10,203,985 B2
(45) Date of Patent: Feb. 12, 2019

(54) INFORMATION PROCESSING APPARATUS, METHOD AND NON-TRANSITORY COMPUTER-READABLE MEDIUM FOR MANAGING A NUMBER OF CONCURRENTLY EXECUTING SUBTASKS BASED ON A THRESHOLD AND PRIORITIES OF SUBTASK QUEUES

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 15/334,744

(22) Filed: Oct. 26, 2016

(65) Prior Publication Data
US 2017/0123850 A1    May 4, 2017

(30) Foreign Application Priority Data

Nov. 2, 2015   (JP) ................................. 2015-215694

(51) Int. Cl.
G06F 9/48         (2006.01)
G06F 9/50         (2006.01)

(52) U.S. Cl.
CPC .......... *G06F 9/4881* (2013.01); *G06F 9/5027* (2013.01); *G06F 9/5038* (2013.01); *G06F 9/5066* (2013.01); *G06F 2209/5017* (2013.01); *G06F 2209/5018* (2013.01); *G06F 2209/548* (2013.01)

(58) Field of Classification Search
None
See application file for complete search history.

(56) References Cited

U.S. PATENT DOCUMENTS

| | | | | |
|---|---|---|---|---|
| 5,940,612 | A * | 8/1999 | Brady | G06F 9/4881 718/102 |
| 6,671,065 | B1 * | 12/2003 | Salgado | G06F 9/5011 358/1.15 |
| 8,209,702 | B1 * | 6/2012 | Roytman | G06F 9/5027 718/106 |
| 8,966,484 | B2 | 2/2015 | Hamada et al. | |
| 2003/0188013 | A1 * | 10/2003 | Nishikado | H04L 67/42 709/238 |

(Continued)

FOREIGN PATENT DOCUMENTS

JP        2003-054451 A      3/2013

*Primary Examiner* — Abu Ghaffari
(74) *Attorney, Agent, or Firm* — Venable LLP

(57) ABSTRACT

In an information processing apparatus, a second controller, if a number of subtasks currently executing in the information processing apparatus does not exceed a threshold, obtains a subtask from one of a plurality of queues and causes the obtained subtask to execute by newly creating a thread, and if the number of subtasks currently executing in the information processing apparatus exceeds the threshold, does not newly create a thread, and the second controller, if a number of subtasks currently executing among subtasks registered in a first queue is less than the upper limit value defined for the first queue, obtains a subtask registered in the first queue and causes the obtained subtask to execute by newly creating a thread regardless of whether or not the number of subtasks currently executing in the information processing apparatus exceeds the threshold.

9 Claims, 12 Drawing Sheets

(56) References Cited

U.S. PATENT DOCUMENTS

| | | |
|---|---|---|
| 2008/0092144 A1 | 4/2008 | Nakazawa |
| 2009/0064168 A1* | 3/2009 | Arimilli ................ G06F 9/5083 |
| | | 718/105 |
| 2013/0061229 A1 | 3/2013 | Hamada et al. |
| 2013/0081033 A1* | 3/2013 | Levien ................ G06F 21/6281 |
| | | 718/102 |
| 2014/0068623 A1* | 3/2014 | Kanemasa ............ G06F 9/4881 |
| | | 718/103 |
| 2014/0109102 A1* | 4/2014 | Duncan ................ G06F 9/3851 |
| | | 718/103 |
| 2015/0205633 A1* | 7/2015 | Kaptur ................ G06F 9/4881 |
| | | 718/102 |
| 2016/0069919 A1* | 3/2016 | Holmes ................ G01N 21/07 |
| | | 506/2 |
| 2017/0293609 A1* | 10/2017 | Seow ................ G06F 17/2785 |

* cited by examiner

FIG. 11A

```
1101 ── public void Start( string taskId, string className, string contents )
                                    1105            1106             1107
1102 ── internal bool Enqueue( Subtask subtask, string queueName )
1103 ── internal void OnSubtaskEnd( SubtaskResult result )
1104 ── internal void Remove( string taskId )
```

FIG. 11B

```
public abstract class TaskBase {
    private TaskController controller;
    private int subtaskCounter;
    internal TaskBase WithController( TaskController controller ) {
        this.controller = controller;
1111￤   this.subtaskCounter = 0;
        return this;
    }
1112 ── public abstract void Go( string taskId, string contents );
    protected abstract bool OnSubtaskEnd(
        subtaskResult result, bool isLastSubtask );
    internal bool OnSubtaskEnd( SubtaskResult result ) {
1113￤   return OnSubtaskEnd( result,
            Interlocked.Decrement( ref subtaskCounter ) == 0 );  ──1117
    }
    protected bool Enqueue( Subtask subtask, string queueName ) {
        if ( controller.Enqueue( subtask, queueName ) ) {
        1115 Interlocked.Increment( ref subtaskCounter );
1114￤   1116 return true;
        }
        return false;
    }
}
```

FIG. 11C

```
public sealed class Subtask {
    public string TaskId;        ── 1121
    public string SubtaskId;     ── 1122
    public string ClassName;     ── 1123
    public string Contents;      ── 1124
}
```

FIG. 11D

```
public abstract class SubtaskBase {
    public abstract SubtaskResult Go( Subtask subtask );   ── 1125
}
```

FIG. 11E

```
public class SubtaskResult {
    public String TaskId;         ── 1126
    public String SubtaskId;      ── 1127
    public StatusCode Status;     ── 1128
    public object Result;         ── 1129
}
```

FIG. 11F

```
public void Cancel( string taskId )          ─1131
public bool IsCanceling( string taskId )    ─1132
```

FIG. 11G

```
public class TaskWithStatus {
public TaskBase Task;        ─1133
public TaskStatus Status;    ─1134
}
public enum TaskStatus {
    Running, Canceling       ─1135
}
```

INFORMATION PROCESSING APPARATUS, METHOD AND NON-TRANSITORY COMPUTER-READABLE MEDIUM FOR MANAGING A NUMBER OF CONCURRENTLY EXECUTING SUBTASKS BASED ON A THRESHOLD AND PRIORITIES OF SUBTASK QUEUES

BACKGROUND OF THE INVENTION

Field of the Invention

The present invention relates to an information processing apparatus and a method of controlling the same, and a non-transitory computer-readable medium.

Description of the Related Art

Conventionally, in information processing apparatuses such as PCs, in processing for executing multiple tasks using multithreading, when enqueuing tasks into a queue associated with a thread, control is performed to make the processing of the respective threads equal based on the length of the queue, task execution time, or the like. By this, task execution is performed efficiently (for example, refer to Japanese Patent Laid-Open No. 2013-54451).

However, with the foregoing conventional technique there is a problem in that even in the case where a degree of priority of a task is high (when it is desired to be executed urgently), since the task is enqueued at the end of the queue, the task whose degree of priority is high will not be executed so long as tasks whose degree of priority is low which were enqueued first do not complete. Also, even if there is an empty queue and a thread associated with the empty queue is in an idle state, tasks accumulated in a queue other than the empty queue will not be executed until they are enqueued by the thread associated with the other queue. As a result, operation becomes inefficient.

SUMMARY OF THE INVENTION

According to one aspect of the present invention, there is provided an information processing apparatus comprising: a first controller configured to control execution of a plurality of tasks; a plurality of queues in which one or more subtasks generated from one task that operates in the first controller are registered and including a first queue and a second queue that has a lower degree of priority than the first queue; and a second controller configured to obtain a subtask registered in the plurality of queues and to cause the obtained subtask to execute by creating a thread, wherein for each of the plurality of queues, an upper limit value of a number of subtasks executed simultaneously among subtasks registered in itself is defined, and the second controller, manages a threshold corresponding to a number of subtasks executed simultaneously in the information processing apparatus, and if a number of subtasks currently executing in the information processing apparatus does not exceed the threshold, obtains a subtask from one of the plurality of queues and causes the obtained subtask to execute by newly creating a thread, and if the number of subtasks currently executing in the information processing apparatus exceeds the threshold, does not newly create a thread, and the second controller, if a number of subtasks currently executing among subtasks registered in the first queue is less than the upper limit value defined for the first queue, obtains a subtask registered in the first queue and causes the obtained subtask to execute by newly creating a thread regardless of whether or not the number of subtasks currently executing in the information processing apparatus exceeds the threshold.

According to another aspect of the present invention, there is provided a method of controlling an information processing apparatus that comprises a first controller configured to control execution of a plurality of tasks; a plurality of queues in which one or more subtasks generated from one task that operates in the first controller are registered and including a first queue and a second queue that has a lower degree of priority than the first queue; and a second controller configured to obtain a subtask registered in the plurality of queues and to cause the obtained subtask to execute by creating a thread, the method comprising: defining, for each of the plurality of queues, an upper limit value of a number of subtasks executed simultaneously among subtasks registered in itself, and in the second controller, managing a threshold corresponding to a number of subtasks executed simultaneously in the information processing apparatus, and if a number of subtasks currently executing in the information processing apparatus does not exceed the threshold, obtaining a subtask from one of the plurality of queues and causing the obtained subtask to execute by newly creating a thread, and if the number of subtasks currently executing in the information processing apparatus exceeds the threshold, not newly creating a thread, and in the second controller, if a number of subtasks currently executing among subtasks registered in the first queue is less than the upper limit value defined for the first queue, obtaining a subtask registered in the first queue and causing the obtained subtask to execute by newly creating a thread regardless of whether or not the number of subtasks currently executing in the information processing apparatus exceeds the threshold.

According to another aspect of the present invention, there is provided a non-transitory computer-readable medium storing a computer program for causing a computer to function as a first controller configured to control execution of a plurality of tasks; a plurality of queues in which one or more subtasks generated from one task that operates in the first controller are registered and including a first queue and a second queue that has a lower degree of priority than the first queue; and a second controller configured to obtain a subtask registered in the plurality of queues and to cause the obtained subtask to execute by creating a thread, wherein for each of the plurality of queues, an upper limit value of a number of subtasks executed simultaneously among subtasks registered in itself is defined, and the second controller manages a threshold corresponding to a number of subtasks executed simultaneously in the computer, and if a number of subtasks currently executing in the computer does not exceed the threshold, obtains a subtask from one of the plurality of queues and causes the obtained subtask to execute by newly creating a thread, and if the number of subtasks currently executing in the computer exceeds the threshold, does not newly create a thread, and the second controller, if a number of subtasks currently executing among subtasks registered in the first queue is less than the upper limit value defined for the first queue, obtains a subtask registered in the first queue and causes the obtained subtask to execute by newly creating a thread regardless of whether or not the number of subtasks currently executing in the computer exceeds the threshold.

By the present application invention it becomes possible to perform processing efficiently when processing a task using a queue.

Further features of the present invention will become apparent from the following description of exemplary embodiments (with reference to the attached drawings).

BRIEF DESCRIPTION OF THE DRAWINGS

FIG. 11A is a view for illustrating an example of methods that a task controller has.

FIG. 11B is a view for illustrating an example of a class instance that inherits from a TaskBase abstract class.

FIGS. 11C, 11D, and 11E are views for illustrating an example of a definition of subtask definition data and a class.

FIGS. 11F and 11G are views for illustrating an example of a definition of a class according to a second embodiment.

DESCRIPTION OF THE EMBODIMENTS

Hereinafter, embodiments for working the present invention are explained using drawings.

<First Embodiment>

[System Configuration]

Figure 2:
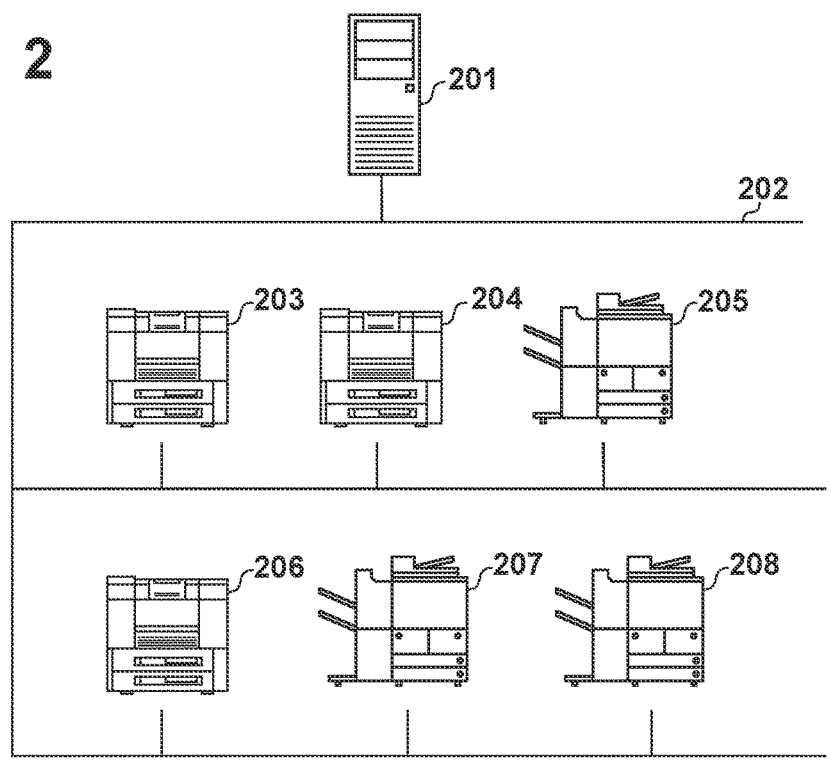
FIG. 2 is a view for illustrating an example configuration of a network system according to the present invention.

FIG. 2 is a view for illustrating an example configuration of a network system according to the present invention. A host computer 201 is an information processing apparatus and a management application for managing a plurality of network devices connected to a network 202 operates therein. Image forming apparatuses 203 through 208 respectively are network devices and are managed by the management application that the host computer 201 is equipped with. An operation of the management application according to the present application invention will be described later.

Figure 3:
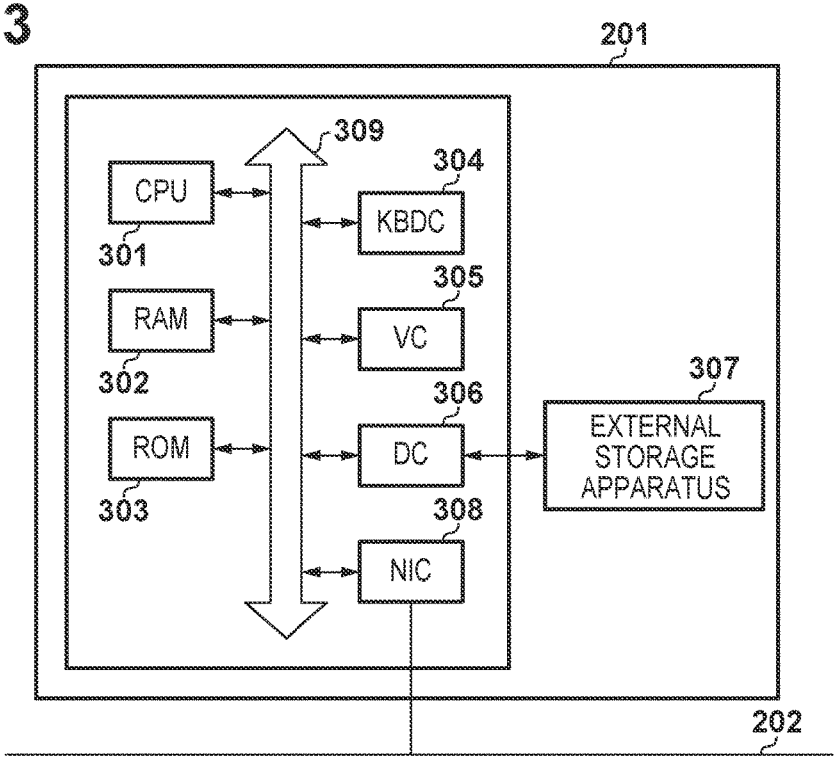
FIG. 3 is a view for illustrating an example of a hardware configuration of a host computer.

FIG. 3 is a view for illustrating an example of a hardware configuration of the host computer 201. The host computer 201 is equipped with a CPU 301, a RAM 302, a ROM 303, and an external storage apparatus 307. The CPU 301 executes software recorded in the ROM 303 or the external storage apparatus 307 or downloaded via the network 202 and comprehensively controls each device that the host computer 201 is equipped with. The RAM 302 is a volatile storage area and functions as a main memory for the CPU 301, a work area, or the like. The external storage apparatus 307 is a non-volatile storage area and is configured from a hard disk (HD), a solid state drive (SSD), or the like. The external storage apparatus 307 is a non-volatile storage area and records various user files, database data, applications and the like including a boot program, an operating system, an authentication server, an authentication client, and the like.

Furthermore, the host computer 201 is equipped with a keyboard controller (KBDC) 304, a video controller (VC) 305, a disk controller (DC) 306, and a communication controller (NIC) 308. The keyboard controller 304 sends input information from a keyboard or a pointing device (not shown) to the CPU 301. The video controller 305 controls a display of a display apparatus configured from an LCD (Liquid Crystal Display) or the like. The disk controller 306 controls access to the external storage apparatus 307. The communication controller 308 is an interface with the network 202 and connects the host computer 201 and the network 202. Also, configuration elements other than the external storage apparatus 307 described above are connected communicably with each other via a bus 309.

[The Management Application]

A function of a management application that the host computer 201 is equipped with according to the present application invention will be described. The management application, for example, obtains the following various information from each image forming apparatus connected to the network 202 and manages it.

(1) Obtain status information of each image forming apparatus at every fixed interval (2) Receive an error occurrence notification transmitted from an image forming apparatus when an error occurs in the image forming apparatus and obtain status information of the image forming apparatus (3) Obtain consumable article information of each image forming apparatus at every fixed interval (4) Obtain input information (remaining amount and type of sheet) of each image forming apparatus at each fixed interval (5) Obtain various counter information of each image forming apparatus at each fixed interval (6) Obtain various setting value data of each image forming apparatus at each fixed interval (7) Scan the network at a designated time and search for image forming apparatuses on the network Here, the fixed interval and the designated time are defined in advance, and also values differing between each process may be set. Also, although seven functions are illustrated above as functions of the management application, limitation is not made to this. Also, as to what functions are valid, a user of the management application may be capable of freely selecting them.

For example, for a function for obtaining status information, processing for obtaining the status information in relation to each image forming apparatus is started at regular intervals. Furthermore, for the function for obtaining status information, a setting for the image forming apparatus to transmit an error occurrence notification to the management application upon an error occurrence at regular intervals is performed for each image forming apparatus. Also, for the function for obtaining status information, when the error occurrence notification is received from the image forming apparatus, current status information from the image forming apparatus is obtained.

For status information, consumable article information, input information, and various counter information, obtainment of this information from each image forming apparatus ends in a short time because the information amount of these is a comparatively small amount. Meanwhile, there are many cases when the data amount for various setting value data is large and obtainment of such will require a long time. Also, for the obtainment of status information, there are many cases when a restriction that an occurrence of an error of the image forming apparatus be notified to the user within the predetermined time from the occurrence of the error is arranged. For this reason, if an error notification is received from an image forming apparatus, it is necessary to immediately obtain the status information from the image forming apparatus. Meanwhile, this time constraint is not arranged in regards to the obtainment of various setting value data. In other words, for information of the image forming apparatus that the management application manages, properties for when handling differ in accordance with the content of this information.

Figure 1:
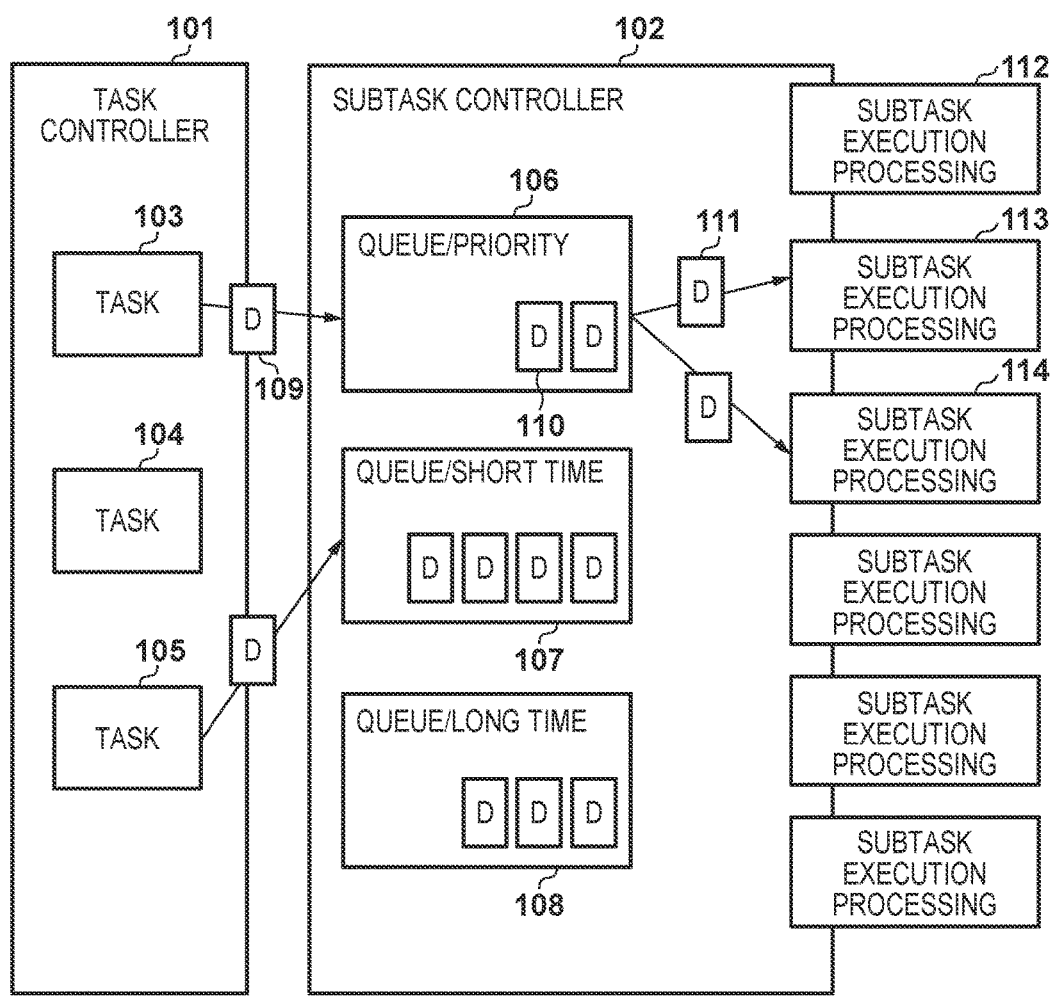
FIG. 1 is a view for describing a functional configuration of a management application according to the present application invention.

FIG. 1 is a view for describing a functional configuration of the management application of the host computer 201 according to the present invention. Using FIG. 1, description will be given for control of tasks and subtasks according to the present application invention.

In the present application invention one task controller 101 controls execution of a plurality of tasks. In other words, the plurality of tasks operate in one task controller 101. In FIG. 1, three tasks 103 through 105 that operate in the task controller 101 are illustrated as an example. For example, obtainment of status information, obtainment of consumable article information, obtainment of various setting value data, and the like correspond to the tasks 103 through 105 respectively. Also, one task is divided into a plurality of subtasks. For example, if there is a task that relates to processing for obtaining status information in the management application, processing for obtaining status information from each image forming apparatus, and setting for notification of error occurrences made to each image forming apparatus become subtasks respectively. Note, the number of subtasks created from one task differs in accordance with the target or the processing content of the task.

In FIG. 1, each element illustrated as subtask definition data 109 through 111 is data that defines processing content of the subtask respectively. Also, each element illustrated as subtask execution processing 112 through 114 are subtask execution processes for executing processing indicated in the subtask definition data and are executed in separate threads respectively. In other words, the number of threads is the number of subtasks currently executing (subtask execution processing).

Also, in the present application invention one subtask controller 102 manages a plurality of subtask queues. In FIG. 1 three subtask queues 106, 107, and 108 are arranged as an example. The subtask queues 106, 107, and 108 respectively store subtask definition data. For the tasks 103 through 105 respectively, a plurality of subtask definition data items are created, and these are added (enqueued) to one of the plurality of subtask queues that the subtask controller 102 manages. For the subtask execution processing, the subtask definition data is obtained (dequeued) from the subtask queues and the subtask is executed in accordance with the subtask definition data.

As illustrated in FIG. 1, the plurality of subtask queues respectively are used separately in accordance with a feature of the stored subtask definition data. Subtask definition data of a high priority of execution is stored in a subtask queue 106. For example, definition data of a subtask that must be processed immediately as with the obtainment of a state accompanying error notification from the image forming apparatus is stored to the subtask queue 106. Subtask definition data stored in the subtask queue 106 is processed preferentially by the subtask execution processing over subtask definition data stored in another subtask queue. Subtask definition data for which processing that takes a short time to complete such as obtainment of status information or obtainment of consumable article information is stored in the subtask queue 107. The subtask definition data for processing that takes a long time to complete such as processing for obtaining various kinds of setting data is stored in the subtask queue 108. Then, the subtask definition data is processed in accordance with a degree of priority of each stored subtask queue, and here, is preferentially processed in the order of the subtask queue 106, the subtask queue 107, and the subtask queue 108.

Also, in the present embodiment, a recommended value (threshold) for the number of threads (subtask execution processes) caused to operate for the apparatus on the whole is defined and managed in accordance with the status, capabilities, or the like of the host computer 201. Also, for the plurality of subtask queues respectively, threads (subtask execution processes) that process the subtask definition data dequeued from the subtask queues are associated. The range (upper limit value) of the number of threads associated to the subtask queue is also defined and managed. This management will be described later in conjunction with a flowchart.

The task controller 101 controls execution of each task. The task controller 101 performs creation/activation/destruction of a task and processing of a notification of an end of the corresponding subtask or the like to the task that created the subtask definition data. The subtask controller 102 performs processing such as enqueuing/dequeuing of subtask definition data to/from the subtask queues and creation of a thread to start the subtask execution processing, or the like. In the present specification, the task controller 101 is referred to as a "first controller" and the subtask controller 102 is referred to as a "second controller".

Hereinafter, a description will be given using the task 103, the subtask execution processing 112, and the subtask definition data 109 representing each configuration element. The task controller 101 and the subtask controller 102 hold references to each other. The task controller 101 and the task 103 hold references to each other. The subtask execution processing 112 holds a reference to the subtask controller 102.

Also, although in cited code and definition of methods explained below, C# is used as a programming language to give the explanation, the same functions can be realized using another programming language.

Here, explanation will be given regarding methods that the task controller 101 includes using FIG. 11A.

A Start method 1101 is a method that the management application calls when adding a task to the task controller 101. In the Start method 1101, a taskId 1105 which is the first argument is a character sequence for uniquely identifying tasks. A UUID (Universally Unique Identifier) or a GUID (Globally Unique Identifier) is used as, for example, a taskId. A className 1106 which is the second argument is a character sequence that indicates a name of a class that implements the processing of the task. Different processes (such as a status obtainment or a counter obtainment) respectively have different class names. Contents 1107 which is the third argument is a character sequence that defines task details, and for example, a character sequence that serializes an object that stores task details is used.

An Enqueue method 1102 is a method that a task calls when subtask definition data is enqueued into a subtask queue.

An OnSubtaskEnd method 1103 is a method that subtask execution processing in relation to the subtask definition data calls via the subtask controller 102 when processing by the subtask execution processing ends.

A Remove method 1104 is a method that a task calls when processing ends. When the Remove method is called, the task controller 101 deletes a reference to a held task from a task management map.

[Process Flow]

Hereinafter, explanation will be given regarding flows of processing according to the present application invention. Note, each process illustrated hereinafter is realized by the CPU 301 of the host computer 201 reading and executing programs stored in the storage unit of the ROM 303 or the like.

(Addition of a Task)

Figure 4:
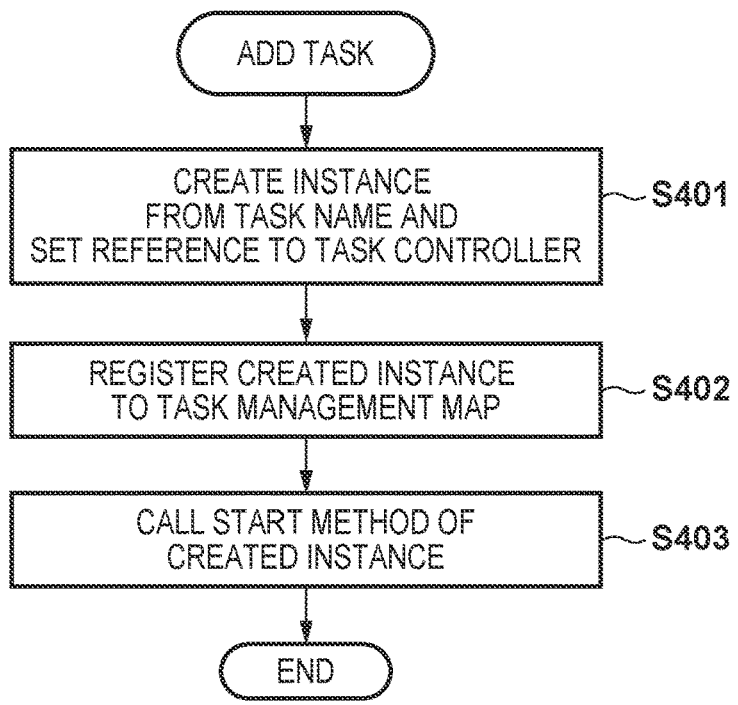
FIG. 4 is a flowchart of processing at a time of enqueuing a task.

FIG. 4 is a flowchart illustrating a flow of processing when the management application that the host computer 201 includes adds a task to the task controller 101.

If the management application requests an addition of a task to the task controller 101, the Start method 1101, illustrated in FIG. 11A, of the task controller 101 is called. The flowchart of FIG. 4 illustrates a flow of processing of the Start method 1101.

When the Start method 1101 is called, in step S401, the task controller 101 uses the className 1106 which is passed as an argument, to create an instance (task 103 here) of the class that implements the execution of a task. Here, the created class instance, for example, is a task that obtains status information from the image forming apparatus and is a task that obtains various setting value data from the image forming apparatus. Different class instances are created for different tasks. Furthermore, the task controller 101 sets a reference to the task controller 101 in the created task 103.

In step S402, the task controller 101 adds the reference to the task 103 created in step S401 to the task management map (not shown) setting the taskId 1105 passed as an argument as a key. The task management map is a map (dictionary) that associates the taskId of a currently executing task as a key with a reference to the task as a value, and is managed by the task controller 101. The task management map is held within the RAM 302.

In step S403, the task controller 101 calls a start method of the task 103 created in step S401. This processing flow is then ended.

The task 103 that the task controller 101 creates in step S401 is an instance of a class that inherits from the TaskBase abstract class as illustrated in FIG. 11B. Note, "inheritance" means that a new class, onto which functions of the inheritance source are passed, is generated. In other words, here, the task 103 is generated as a new class onto which the functions of the TaskBase abstract class are passed. Regarding the inheritance, here, detailed description is omitted because it is known in the field of object-oriented languages such as C.

The task 103 that inherits the TaskBase abstract class implements a WithController method 1111, a Go method 1112, an OnSubtaskEnd method 1113, and an Enqueue method 1114. The WithController method 1111 is a method for performing a setting of a reference to the task controller 101. The Go method 1112 is a method for executing the task. The OnSubtaskEnd method 1113 is a method for accepting a notification of an end of execution of a subtask. The Enqueue method 1114 is a method for enqueuing the subtask definition data 109 into a subtask queue.

The task controller 101 performs a setting of a reference to the task controller 101 from the task 103 created in step S401 by calling the WithController method 1111. Also, the task controller 101 executes a calling of the start method of step S403 by calling the Go method 1112.

(Start of a Task)

Figure 5:
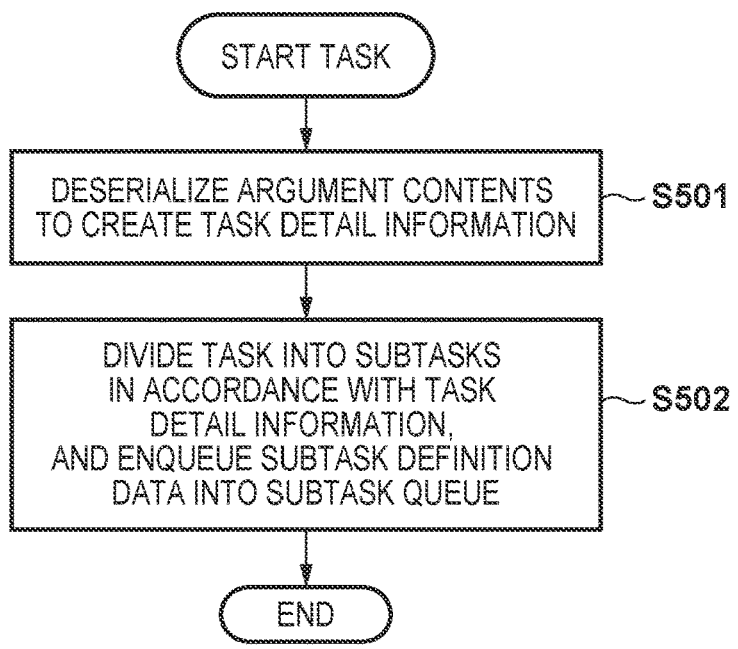
FIG. 5 is a flowchart of processing of a Go method of a task processing class.

FIG. 5 is a flowchart illustrating a flow of processing of the Go method 1112 and the task 103 that inherits from the TaskBase abstract class.

In step S501, the task 103 deserializes (converts) the contents which is an argument of the Go method 1112, to create an object (task detail information) that includes details of the task. For example, if a task for obtaining status information of the management application is designated as contents, the detailed information of the task is a list of network addresses of image storage devices which become targets for obtaining status information.

In step S502, the task 103, based on the task detail information created in step S501, divides the task into a plurality of subtasks and creates the subtask definition data 109 that represents respective subtasks. For example, if the task for obtaining status information is as described above, a subtask is obtainment of statuses for each image forming apparatus, and network addresses of each image forming apparatus targeted for obtainment are designated in the subtask definition data.

Furthermore, the task 103 enqueues the subtask definition data in one among the plurality of subtask queues that the subtask controller 102 includes in accordance with properties of the generated subtask definition data. The task 103 calls the Enqueue method 1114 of the TaskBase class to enqueue the subtask definition data 109 to a subtask queue. Processing of the Enqueue method 1114 of the base class TaskBase firstly calls an Enqueue method 1115 of the task controller 101 as illustrated in FIG. 11B. In the processing of the Enqueue method 1115 of the task controller 101, in a case when an enqueue of subtask definition data to the designated subtask queue succeeds, true is returned, and in a case of failure, false is returned. The base class TaskBase causes a value of a subtask counter held within the class to increase by one if enqueuing to the subtask queue of the subtask definition data succeeds (1116). The value of the subtask counter is a sum of the number of subtasks being executed by the subtask execution processing and the number of subtask definition data items within the current subtask queue among the subtask definition data that the task 103 enqueued into the subtask queue.

FIG. 11C illustrates an example of a structure of the subtask definition data 109. A TaskId 1121 is a TaskId (taskId 1105 passed into the Start method 1101) that is passed in the task addition process of FIG. 4. A SubtaskId 1122 is a character sequence for uniquely identifying each subtask. A ClassName 1123 is a name of a class that executes a subtask. Contents 1124 is a character sequence that includes details of the processing of each subtask. The SubtaskId 1122, the ClassName 1123, and the Contents 1124 together are generated by the task 103.

The subtask queues respectively have a name for uniquely identifying the queue, a number of subtasks which are subtasks enqueued in the queue and that are being executed by the current subtask execution processing, and information of an upper limit value for the number of subtasks that can be simultaneously executed corresponding to the queue. Also, the subtask controller 102 holds a threshold of a total number of subtasks that can be executed simultaneously overall. The upper limit value of the number of simultaneous executions of subtasks of each subtask queue and the threshold of the total number overall that the subtask controller 102 manages have the following relationships.

1. The total of the upper limits of each subtask queue>the threshold of the total number 2. The total of the upper limits of the subtask queues other than that for the high degree of priority ≤the threshold of the total number In the present embodiment, the threshold of the total number and the upper limits of each subtask queue are decided by the subtask controller 102 at the time of creation (at a time of activation) of the subtask controller 102 based on the capability and the state of the host computer 201.

(Enqueuing of Subtask Definition Data)

Figure 6:
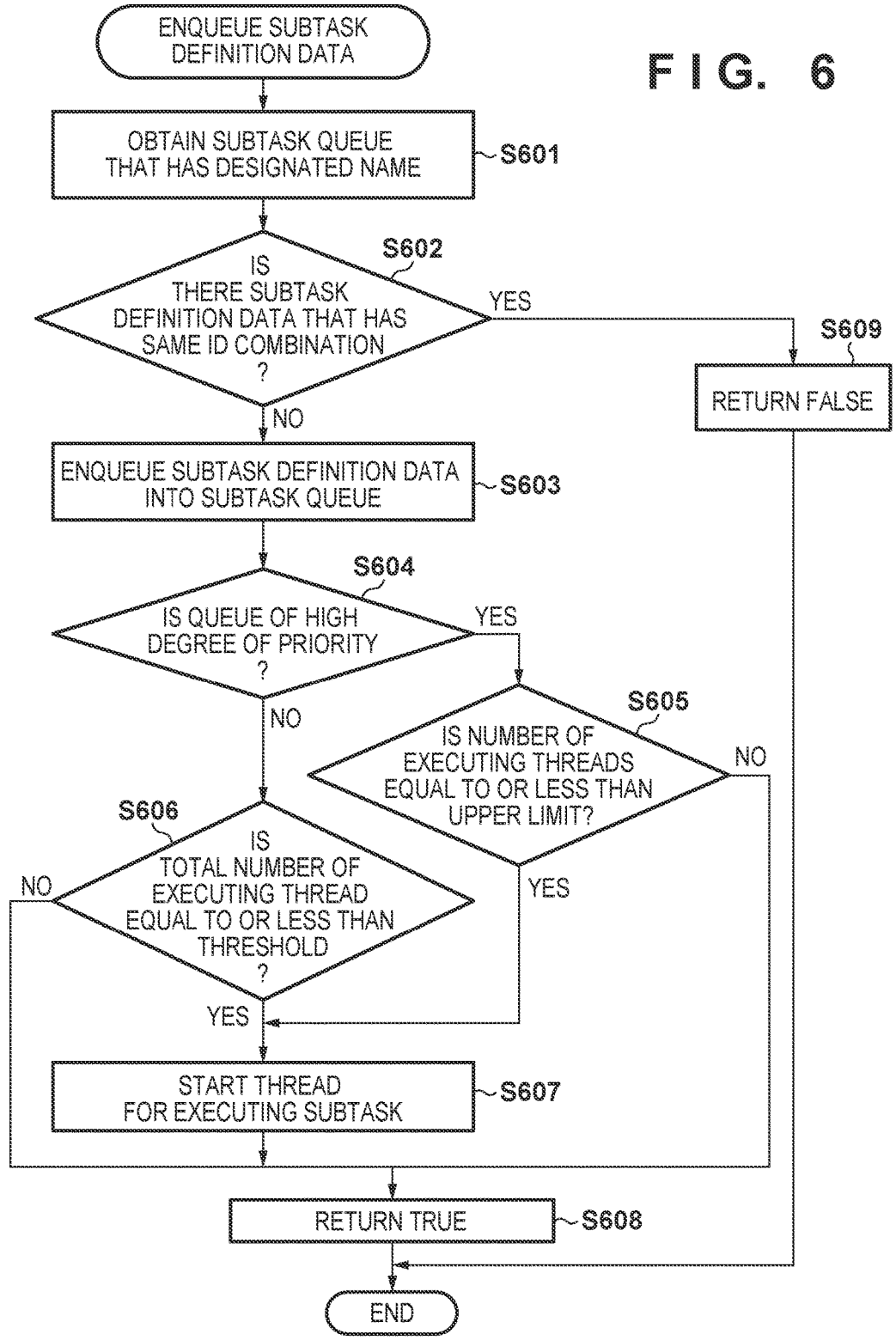
FIG. 6 is a flowchart of processing that enqueues subtask definition data to a subtask queue.

FIG. 6 is a flowchart illustrating processing that enqueues subtask definition data into a subtask queue that the subtask controller 102 designated in accordance with the enqueue request made in step S502 of FIG. 5. Here, the Enqueue method 1114 is called and the subtask definition data and the name of the subtask queue that is the enqueue destination are passed as arguments.

In step S601, the subtask controller 102 obtains the subtask queue that has the name of the provided subtask queue from a list of subtask queues.

In step S602, the subtask controller 102 confirms whether or not subtask definition data that has the same combination as the combination of the SubtaskId and the TaskId of the provided subtask definition data exists within the subtask queue obtained in step S601. If the result of the confirmation is that subtask definition data of the same combination exists within the subtask queue obtained in step S601 (YES in step S602), the subtask controller 102 returns false in step S609. This processing flow then ends. Here, returning false means that the designated subtask definition data could not be enqueued into the subtask queue. If subtask definition data which holds the same combination of the TaskId and the SubtaskId within the subtask queue does not exist (NO in step S602), transition is made to step S603.

In step S603, the subtask controller 102 enqueues the provided subtask definition data into the obtained subtask queue.

For example, if a task for obtaining the status information of the management application obtains status information from an image forming apparatus targeted for management at each fixed interval, there is a possibility that subtask definition data which was added previously exists within the subtask queue if the obtainment processing has not ended within the period. An enqueue of subtask definition data that performs the same processing can be suppressed by the determination (step S602) of an overlap of the combination of IDs.

In the following processing, the subtask controller 102 determines whether or not to start a thread for executing a subtask.

In step S604, the subtask controller 102 determines whether or not the obtained subtask queue is the subtask queue of the high degree of priority. Here, the subtask queue of the high degree of priority corresponds to the subtask queue 106 of FIG. 1 for example. In a case that the result of the determination is that it is the subtask queue of the high degree of priority (YES in step S604), transition is made to step S605, and when this is not the case (NO in step S604), transition is made to step S606.

In step S605, the subtask controller 102 determines whether or not the number of currently executing subtasks of the subtask queue of the high degree of priority is equal to or less than the upper limit number defined in relation to that subtask queue. If the number of currently executing subtasks exceeds the upper limit (NO in step S605), the subtask controller 102 returns true in step S608. This processing flow then ends. Here, a returning true means that the designated task definition data could be enqueued. Meanwhile, if equal to or less than the upper limit number (YES in step S605), transition is made to step S607.

In step S606, the subtask controller 102 determines whether or not the total number of subtask execution processes (threads) being executed is equal to or less than the threshold of the total number of threads. If the result of the determination is that the threshold is exceeded (NO in step S606), the subtask controller 102 returns true in step S608. This processing flow then ends. Meanwhile, if equal to or less than the threshold (YES in step S606), transition is made to step S607.

In step S607, the subtask controller 102 creates a thread for executing a subtask, and starts the subtask execution processing 112. After this, the subtask controller 102 returns true in step S608. This processing flow then ends.

(Subtask Execution Processing)

Figure 7:
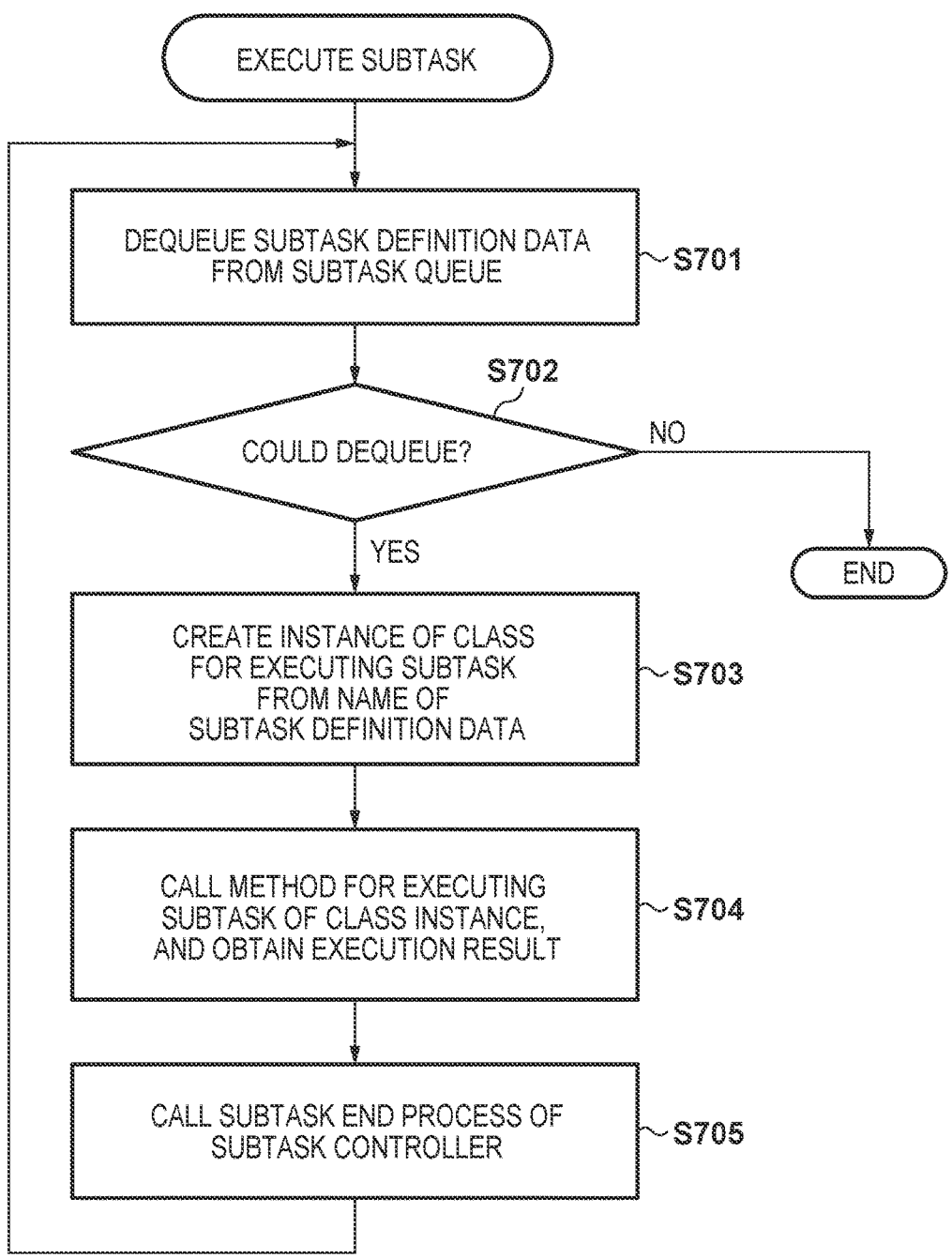
FIG. 7 is a flowchart of processing for executing a subtask.

FIG. 7 is a flowchart illustrating a flow of processing for an execution of a subtask executed in a separate thread. In step S607 of FIG. 6, the subtask controller 102 creates a thread, and starts the processing of the subtask. The subject of execution of the processing is the subtask controller 102.

In step S701, the subtask controller 102 calls processing for which subtask definition data is dequeued from the subtask queue. The details of the processing will be explained later using FIG. 8A and FIG. 8B.

In step S702, the subtask controller 102 determines whether or not the subtask definition data can be dequeued. If the subtask definition data could not be dequeued (NO in step S702), this processing flow ends and the thread ends. If the subtask definition data can be dequeued (YES in step S702), transition is made to step S703.

In step S703, the subtask controller 102 creates an instance of a class for executing a subtask from the ClassName attribute (ClassName 1123 of FIG. 11C) within the subtask definition data 109. Here, the class instance for executing the created subtask is a class which inherits from an abstract class as illustrated in FIG. 11D. A Go method 1125 illustrated in FIG. 11D has subtask definition data in an argument and is a process by which a subtask is executed in accordance with the processing content recorded in the subtask definition data.

In step S704, the subtask controller 102 calls the Go method 1125 of the class instance for executing the subtask created in step S703, and obtains the execution result (FIG. 11E) which is a return value of the method.

In step S705, the subtask controller 102 calls the OnSubtaskEnd method 1103 of the subtask controller 102 setting the execution result obtained in step S704 as the argument. After this, the subtask controller 102 returns to the processing of step S701. Details of overall processing for when a subtask ends including this subtask end processing are explained later using FIG. 9.

FIG. 11E illustrates a definition of a class that stores the execution result of the subtask. In an execution result, for a TaskId 1126 and a SubtaskId 1127, values of attributes of the same name that are included in the subtask definition data 109 are stored. A Status 1128 indicates the status of the execution result (success, error termination, and termination by exception). A Result 1129 is a reference to the instance of the class which inherits from an Object class which includes the details of the result.

(Dequeuing of Subtask Definition Data)

Figure 8A:
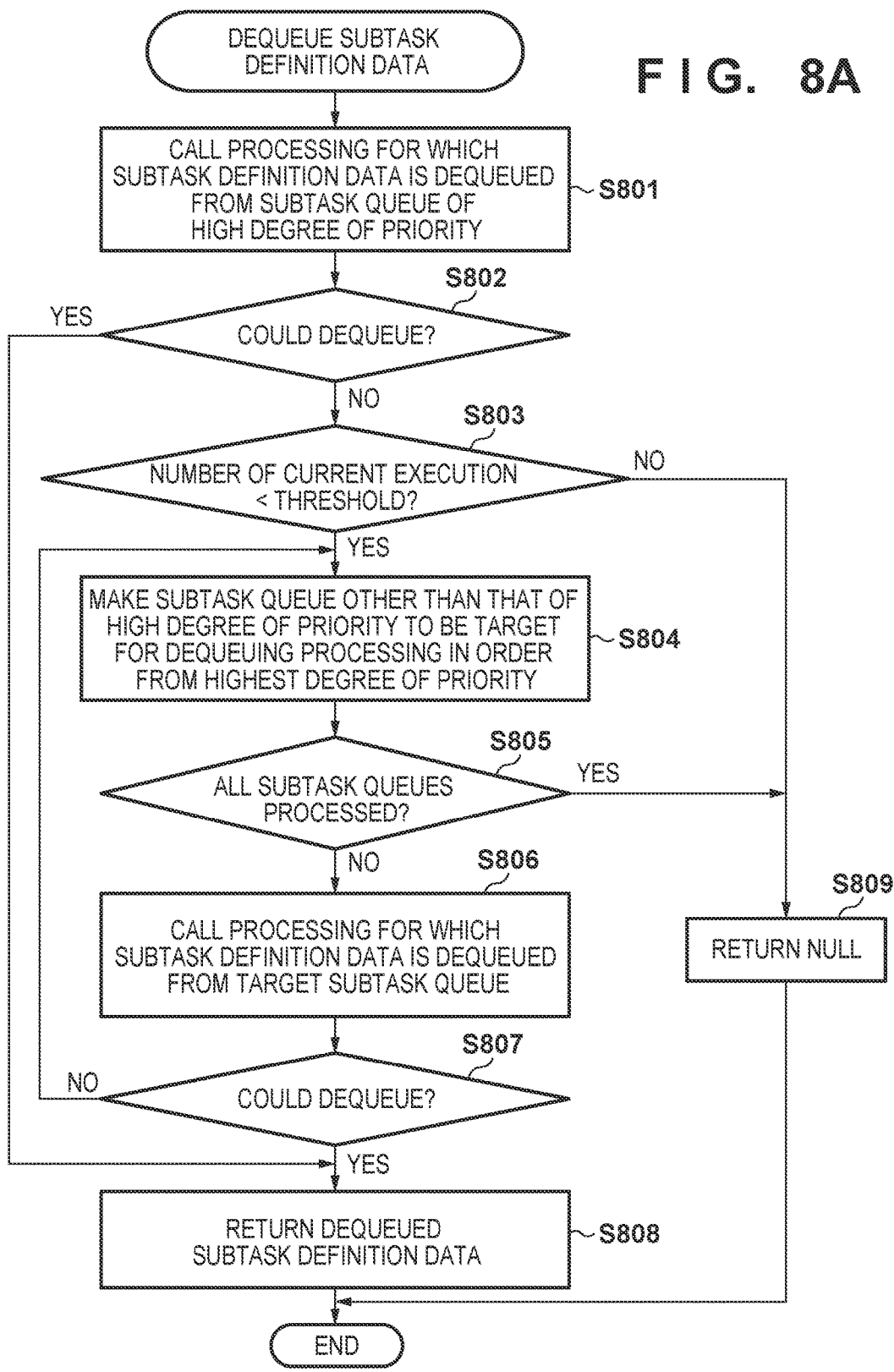
FIG. 8A is a flowchart of processing that dequeues subtask definition data from a subtask queue.

FIG. 8A, is a flowchart illustrating a flow of processing for which subtask definition data is dequeued from a subtask queue called in step S701 of FIG. 7.

In step S801, the subtask controller 102 calls processing for which subtask definition data is dequeued from the subtask queue 106 of the high degree of priority. Here, the details of the processing here will be explained later using FIG. 8B.

In step S802, the subtask controller 102 determines whether or not the subtask definition data was dequeued from the subtask queue 106 of the high degree of priority. If the subtask definition data could be dequeued (YES in step S802), the subtask controller 102 returns the dequeued subtask definition data in step S808. This processing flow then ends. If it cannot be dequeued (NO in step S802), transition is made to step S803. Here, the case of not being able to dequeue corresponds to a case in which the subtask definition data does not exist in the subtask queue of the high degree of priority, or a case in which the number of currently executing subtasks of the subtask queue of the high degree of priority reaches the upper limit value.

In step S803, the subtask controller 102 compares the current number of subtask executions (total number of currently executing subtasks within each subtask queue) and the threshold of the total number of subtasks which execute as the whole apparatus. If the result of the comparison is that the number of executions is equivalent or larger to the threshold (NO in step S803), the subtask controller 102 returns null in step S809. This processing flow then ends. The subtask execution processing 112 which called this processing ends the processing and this means that the thread in which the processing is executed ends. If the total number is smaller than the threshold (YES in step S803), transition is made to step S804.

In the processing from step S804, the subtask controller 102 performs, in accordance with the degree of priority, processing which dequeues the subtask definition data from subtask queues other than that for the high degree of priority.

In step S804, the subtask controller 102 sets the target for dequeuing processing in order from the highest degree of priority from the subtask queues of other than that of the high degree of priority. In the example of FIG. 1, firstly, the subtask queue 107 is made to be the target of the dequeuing processing, and after the processing for the subtask queue 107 completes, the subtask queue 108 is made to be the target of the dequeuing processing.

In step S805, the subtask controller 102 determines whether or not the processing of all of the subtask queues is complete. If the processing corresponding to all subtask queues has completed (YES in step S805), the subtask controller 102 returns null in step S809. This processing flow then ends. If the process corresponding to the all subtask queues has not been completed (NO in step S805), transition is made to step S806.

In step S806, the subtask controller 102 performs processing for which subtask definition data is dequeued from the subtask queue which is the processing target. Here, the processing is the same as the processing of step S801, and details will be explained using FIG. 8B.

In step S807, the subtask controller 102 determines whether or not the subtask definition data can be dequeued. If it was possible to dequeue (YES in step S807), the subtask controller 102 returns the dequeued subtask definition data in step S808. This processing flow then ends. If it was not possible to dequeue (NO in step S807), step S804 is returned to, and the subtask controller 102 repeats the same processing with respect to the subtask queue of the next degree of priority.

Figure 8B:
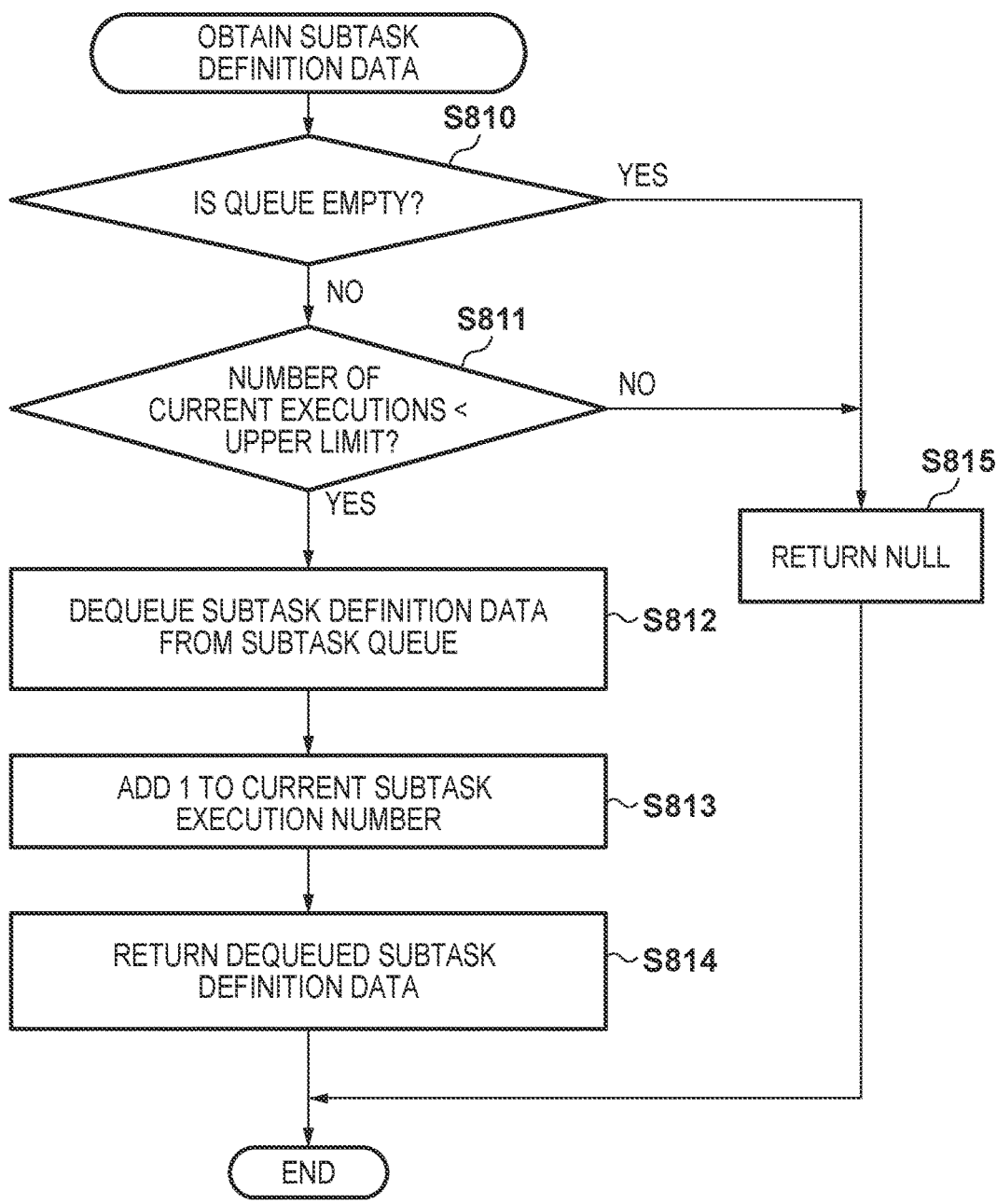
FIG. 8B is a flowchart of processing that dequeues subtask definition data from a subtask queue.

FIG. 8B, is a flowchart illustrating a flow of processing for which task definition data is dequeued from a subtask queue called in step S801 and in step S806 of FIG. 8A.

In step S810, the subtask controller 102 determines whether or not there is subtask definition data in the subtask queue which is the processing target. If the subtask definition data does not exist, specifically, if the subtask queue targeted for processing is empty (YES in step S810), the subtask controller 102 returns null in step S815. This processing flow then ends. If the subtask definition data exists within the subtask queue (NO in step S810), transition is made to step S811.

In step S811, the subtask controller 102 compares the current number of subtask executions of the subtask queue targeted for processing with the upper limit value. If the result of the comparison is that the number of executions is equivalent or larger to the upper limit value (NO in step S811), the subtask controller 102 returns null in step S815. This processing flow then ends. If the total number of executions is smaller than the upper limit value (YES in step S811), transition is made to step S812.

In step S812, the subtask controller 102 dequeues subtask definition data from the subtask queue which is the processing target.

In step S813, the subtask controller 102 increases (counts) the current number of subtask executions by one.

In step S814, the subtask controller 102 returns the dequeued subtask definition data. This processing flow then ends.

Above, for the subtask definition data enqueued in the subtask queue of the high degree of priority, a thread is created to cause execution to start even if the number of currently executing subtasks exceeds the threshold, if the upper limit number defined for the subtask queue of the high degree of priority is not exceeded. Meanwhile, for subtask definition data enqueued in another subtask queue, a thread is not created if the number of currently executing tasks exceeds the threshold. Because of this, it becomes possible to control a number of processes by threads to efficiently process subtasks.

[Notification of End of Execution of a Subtask]

Figure 9:
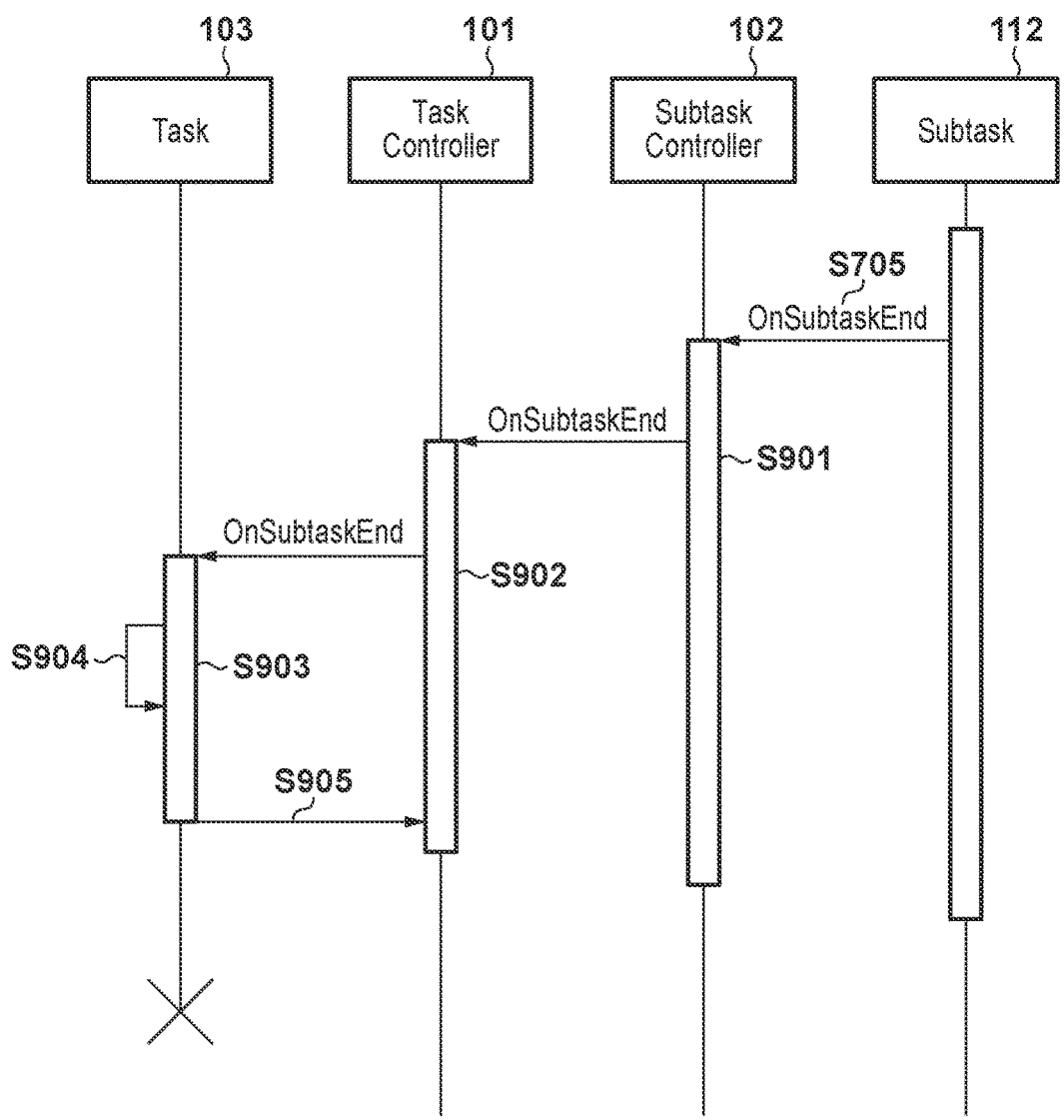
FIG. 9 is a view for illustrating a flow of processing of a notification of the end of execution of a subtask.

FIG. 9 is a sequence chart illustrating a flow up until a notification of the end of execution of a subtask is notified to a task which created the subtask definition data from a thread which processes execution of the subtask. In FIG. 9, Subtask on the right end is the subtask execution processing 112, and is processing of the subtask controller 102, but to make the description easier to understand, it is shown in a different column to the column for the subtask controller 102.

In step S705 of FIG. 7, the subtask controller 102 calls OnSubtaskEnd of a subtask end processing (step S901). The execution result of the subtask and the name of the subtask queue in which the definition data of the subtask is stored are passed to OnSubtaskEnd (step S901).

In step S901, the subtask controller 102 subtracts 1 from the number of current subtask executions for the subtask queue that has the passed subtask queue name. After this, the subtask controller 102 calls the subtask end process OnSubtaskEnd (step S902) of the task controller 101. The execution result of the subtask is passed to the subtask end process OnSubtaskEnd (step S902).

In step S902, the task controller 101 obtains a reference to the task 103 from the task management map using the SubtaskId 1127 within the passed subtask execution result as a key. Next, the task controller 101 calls the task end process OnSubtaskEnd (step S903) of the obtained task 103. In the task end processing OnSubtaskEnd (step S903), the OnSubtaskEnd method of the TaskBase abstract class which is a base class of the task 103 is called (refer to the OnSubtaskEnd method 1113 of FIG. 11B).

The task 103 subtracts 1 from a value of the subtask counter that it holds, and calls the OnSubtaskEnd method (step S904) which is an abstract method of the TaskBase class that the task 103 implements as illustrated in reference numeral 1117 of FIG. 11B. The OnSubtaskEnd method (step S904) sets the execution result of the subtask and a logical value as arguments as illustrated in reference numeral 1117 of FIG. 11B. Whether or not the result of subtracting 1 from the value of the subtask counter is 0 is passed as a logical value which is the second argument. In other words, true is passed as the logical value if the subtraction result is 0 and false is passed if it is not 0. If the logical value is true, this means that execution of the all subtask definitions that the task 103 added to the subtask queue has ended.

The task 103 performs processing that is appropriate based on the subtask execution result in the subtask end processing OnSubtaskEnd method (step S904). After this, in step S905, it returns true to the task controller 101 if execution of the task 103 completes, and it returns false to the task controller 101 if execution of the task 103 has not completed. Here, if true is returned, the task controller 101 deletes the task 103 from the task management map. In other words, the Remove method 1104 illustrated in FIG. 11A is called, and the task controller 101 deletes from the task management map the reference to the task 103 and the taskId added in step S402 of FIG. 4. Note, the processes of step S902 and step S901 do not return the processing result to the calling side (no return value).

Above, according to this embodiment, it becomes possible to perform processing efficiently when a plurality of subtasks generated from a task are used to process a plurality of subtask queues.

<Second Embodiment>

Explanation will be given regarding a second embodiment according to the present application invention. A detailed explanation will be omitted because the overall configuration in the second embodiment is the same as in the first embodiment. Also, hereinafter, the same reference numerals will be used for equivalent components and equivalent steps as in the first embodiment.

The second embodiment adds a construction for stopping a task currently executing in the task controller 101 of the first embodiment.

A Cancel method 1131 for stopping (canceling) a currently executing task and an IsCanceling method 1132 for returning whether or not a currently executing task was instructed to stop are added to the task controller 101 as illustrated in FIG. 11F.

Here, taskId which is an argument of the Cancel method 1131 and the IsCanceling method 1132 is a character sequence which is designated in the first argument of the Start method 1101 for uniquely identifying a task. Class configuration is as illustrated in FIG. 11G in order to store information of a cancellation status of a currently executing task. Information of a currently executing task stored using a taskId of the task management map as a key includes a reference to a task (Task 1133) and an execution status (Status 1134) as illustrated in FIG. 11G.

The task controller 101 sets "Running" as an execution status of a task for the Status 1134 when a task is registered to the task management map at a time of a calling of the Start method 1101. Also, when the Cancel method 1131 illustrated in FIG. 11F is called, the task controller 101 retrieves information relating to a currently executing task from the task management map using the taskId designated as an argument as a key. Then, the task controller 101 changes the Status 1134 of the task to "Canceling". Values that the Status 1134 can take are defined in reference numeral 1135.

Also, when the IsCanceling method 1132 illustrated in FIG. 11F is called, the task controller 101 retrieves information relating to a currently executing task from the task management map using the taskId designated as an argument as a key. Then, the task controller 101 returns whether or not the Status 1134 is "Canceling". True is returned in a case when the Status 1134 is "Canceling" and false is returned in a case when the Status 1134 is "Running".

Also, cancellation is added in addition to success, error termination, and termination due to an exception as a value that an attribute (Status 1128) indicating the status of the execution result of the class Subtask Result which stores the subtask execution result illustrated in FIG. 11E can take.

(Subtask Execution Processing)

Figure 10:
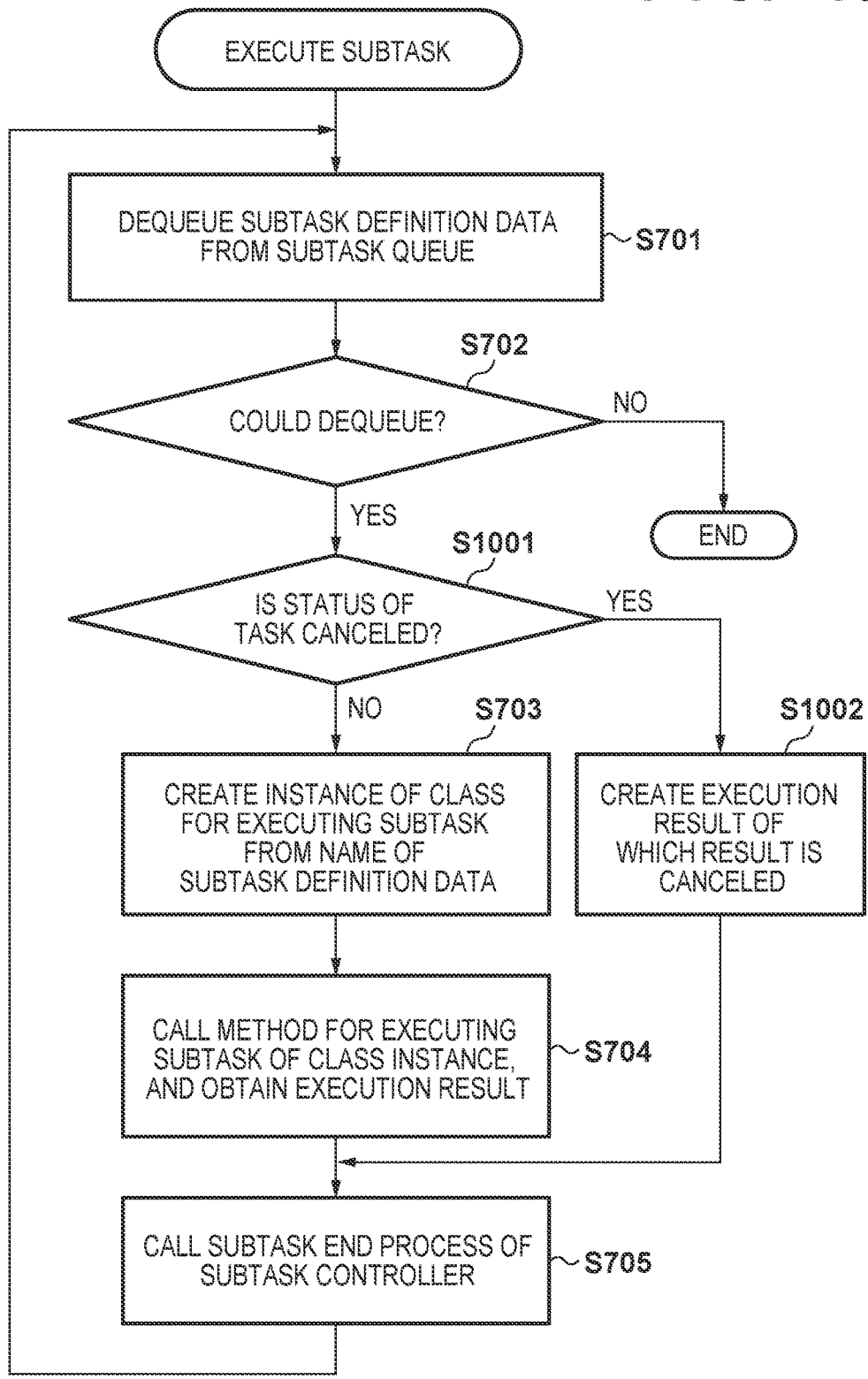
FIG. 10 is a flowchart of processing of a thread that executes a subtask.

FIG. 10 is a flowchart illustrating a flow of processing of the subtask execution processing 112 that is expanded in order to realize a canceling of an execution of a task and that is executed in a separate thread of FIG. 7. Hereinafter, explanation is given only of portions different to FIG. 7.

If a subtask can be dequeued from the subtask queue (YES in step S702), in step S1001, the subtask controller 102 determines whether or not the status of the task which created the subtask definition data obtained from the subtask queue in step S701 is canceled. The determination is performed by the calling the IsCanceling method 1132 of the task controller 101. In a case that the result of the determination is that the status of the task is not canceled (NO in step S1001), transition to step S703, and the subtask controller 102 continues execution of the subtask. If the status of a task is canceled (YES in step S1001), transition is made to step S1002.

In step S1002, the subtask controller 102 creates an execution result of which the status of the execution result of the task is canceled. After this, transition to step S705, and the subtask controller 102 passes the execution result created in step S1002. By this process, after the subtask definition data that the canceled task enqueued is dequeued from the subtask queue, only a notification of the execution result (canceled) is made without executing the processing defined within the subtask definition data. Here, the flow of the notification is as illustrated in FIG. 9.

By this embodiment, in addition to the effect of the first embodiment, it is possible to efficiently advance the processing for a subtask (subtask definition data) that was enqueued by a canceled task without executing it.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-215694, filed Nov. 2, 2015, which is hereby incorporated by reference herein in its entirety.

What is claimed is:

1. An information processing apparatus comprising a memory storing instructions related to a first controller and instructions related to a second controller, and a processor that executes the instructions related to the first controller and the instructions related to the second controller,
   wherein the instructions related to the first controller cause the information processing apparatus to:
   control execution of a task, and
   wherein, in any of a plurality of queues, one or more subtasks generated from the task controlled by the first controller are registered,
   wherein the plurality of queues include a first queue and a second queue that has a lower degree of priority than the first queue;
   wherein for each of the plurality of queues, an upper limit value of a number of subtasks executed simultaneously among subtasks registered in the respective queue is defined, and
   wherein the instructions related to the second controller cause the information processing apparatus to:
   manage a threshold corresponding to a number of subtasks executed simultaneously in the information processing apparatus; and
   if a number of subtasks currently executing in the information processing apparatus does not exceed the threshold, obtain a subtask from one of the plurality of queues and cause the obtained subtask to execute by creating a new thread, wherein,
   if a number of subtasks currently executing among subtasks registered in the first queue is less than the upper limit value defined for the first queue, obtain a subtask registered in the first queue and cause the obtained subtask to execute by creating a new thread regardless of whether or not the number of subtasks currently executing in the information processing apparatus exceeds the threshold,
   wherein if the number of subtasks currently executing in the information processing apparatus exceeds the threshold, a new thread is not created for the subtask registered in the second queue.

2. The information processing apparatus according to claim 1, wherein in accordance with defined processing content, a subtask is registered in one of the plurality of queues, wherein degrees of priority of the plurality of queues differ from each other.

3. The information processing apparatus according to claim 1, wherein
   for each of the plurality of queues, a number of subtasks that are currently executing is managed, and
   the number of subtasks currently executing is increased when the thread corresponding to the subtask is newly created, and is reduced when execution of a subtask according to the thread completes.

4. The information processing apparatus according to claim 1, wherein the instructions related to the second controller further cause the information processing apparatus to notify an execution result to the first controller when execution of the subtask according to the thread completes.

5. The information processing apparatus according to claim 1, wherein the instructions related to the second controller further cause the information processing apparatus, if a task is canceled by the first controller, to complete execution of a subtask generated from the canceled task with cancellation as an execution result without executing processing content defined in the subtask.

6. The information processing apparatus according to claim 1, wherein the instructions related to the second controller further cause the information processing apparatus, in accordance with a status and a function of the information processing apparatus at a time of activation of the second controller, to decide the threshold and the upper limit values corresponding to each of the plurality of queues.

7. The information processing apparatus according to claim 1, wherein the instructions related to the second controller further cause the information processing apparatus, after processing a subtask registered in the first queue is performed, to perform processing subtasks registered in other queues in order from the highest degree of priority of the queues.

8. A method of controlling an information processing apparatus that comprises a first controller and a second controller, the method comprising:
   controlling, by the first controller, execution of a task,
   wherein, in any of a plurality of queues, one or more subtasks generated from the task controlled by the first controller are registered,
   wherein the plurality of queues include a first queue and a second queue that has a lower degree of priority than the first queue;
   defining, by the first controller, for each of the plurality of queues, an upper limit value of a number of subtasks executed simultaneously among subtasks registered in the respective queue,
   managing, by the second controller, a threshold corresponding to a number of subtasks executed simultaneously in the information processing apparatus;
   if a number of subtasks currently executing in the information processing apparatus does not exceed the threshold, obtaining, by the second controller, a subtask from one of the plurality of queues and causing the obtained subtask to execute by creating a new thread, and
   if the number of subtasks currently executing in the information processing apparatus exceeds the threshold, a new thread is not created for the subtask registered in the second queue, and
   if a number of subtasks currently executing among subtasks registered in the first queue is less than the upper limit value defined for the first queue, obtaining, by the second controller, a subtask registered in the first queue and causing the obtained subtask to execute by creating a new thread regardless of whether or not the number of subtasks currently executing in the information processing apparatus exceeds the threshold, wherein if the number of subtasks currently executing in the information processing apparatus exceeds the threshold, a new thread is not created for the subtasks registered in the second queue.

9. A non-transitory computer-readable medium storing a computer program for causing a computer to control an information processing apparatus having a first controller and a second controller, the method comprising:

controlling, by the first controller, execution of a task, wherein in any of a plurality of queues, one or more subtasks generated from the task controlled by the first controller are registered, wherein the plurality of queues include a first queue and a second queue that has a lower degree of priority than the first queue;

defining by the first controller, for each of the plurality of queues, an upper limit value of a number of subtasks executed simultaneously among subtasks registered in the respective queue, managing, by the second controller, a threshold corresponding to a number of subtasks executed simultaneously in the information processing apparatus;

if a number of subtasks currently executing in the information processing apparatus does not exceed the threshold, obtaining, by the second controller, a subtask from one of the plurality of queues and causing the obtained subtask to execute by creating a new thread, and if the number of subtasks currently executing in the information processing apparatus exceeds the threshold, a new thread is not created for the subtask registered in the second queue, and if a number of subtasks currently executing among subtasks registered in the first queue is less than the upper limit value defined for the first queue, obtaining, by the second controller, a subtask registered in the first queue and causing the obtained subtask to execute by creating a new thread regardless of whether or not the number of subtasks currently executing in the information processing apparatus exceeds the threshold, wherein if the number of subtasks currently executing in the information processing apparatus exceeds the threshold, a new thread is not created for the subtasks registered in the second queue.

* * * * *